(12) United States Patent
Brown

(10) Patent No.: US 6,611,842 B1
(45) Date of Patent: Aug. 26, 2003

(54) METHOD AND APPARATUS FOR GENERATING PROFILE DATA

(75) Inventor: Daniel Brown, London (GB)

(73) Assignee: Applied Psychology Research Limited, London (GB)

( * ) Notice: Subject to any disclaimer, the term of this patent is extended or adjusted under 35 U.S.C. 154(b) by 335 days.

(21) Appl. No.: 09/696,356

(22) Filed: Oct. 25, 2000

Related U.S. Application Data

(60) Provisional application No. 60/175,899, filed on Jan. 13, 2000.

(30) Foreign Application Priority Data

Mar. 20, 2000 (GB) .............................................. 0006711

(51) Int. Cl.[7] .............................................. G06F 17/30
(52) U.S. Cl. .............................. 707/102; 707/104; 707/6
(58) Field of Search ................................ 707/9, 104, 3, 707/1, 2, 102, 6; 709/203, 218, 228; 705/1, 14; 703/2; 706/12; 704/270

(56) References Cited

U.S. PATENT DOCUMENTS

| | | | |
|---|---|---|---|
| 5,537,586 A | * | 7/1996 | Amram et al. .................. 707/3 |
| 5,704,017 A | | 12/1997 | Heckerman et al. .......... 706/12 |
| 5,749,081 A | | 5/1998 | Whiteis ....................... 707/102 |
| 5,867,799 A | | 2/1999 | Lang et al. ..................... 707/1 |
| 5,920,856 A | | 7/1999 | Syeda-Mahmood ............ 707/3 |
| 5,978,766 A | | 11/1999 | Luciw ........................... 705/1 |
| 5,983,214 A | | 11/1999 | Lang et al. ..................... 707/1 |
| 6,012,052 A | | 1/2000 | Altschuler et al. ............. 707/2 |
| 6,067,565 A | | 5/2000 | Horvitz ....................... 709/218 |
| 6,085,226 A | | 7/2000 | Horvitz ....................... 709/203 |
| 6,088,718 A | | 7/2000 | Altschuler et al. ........... 709/203 |
| 6,115,708 A | | 9/2000 | Fayyad et al. .................. 707/6 |
| 6,128,663 A | | 10/2000 | Thomas ....................... 709/228 |
| 6,154,767 A | | 11/2000 | Altschuler et al. ........... 709/203 |
| 6,185,534 B1 | | 2/2001 | Breese et al. ................ 704/270 |
| 6,195,622 B1 | | 2/2001 | Altschuler et al. ............. 703/2 |
| 6,195,657 B1 | | 2/2001 | Rucker et al. .................. 707/2 |
| 6,317,722 B1 | * | 11/2001 | Jacobi et al. .................. 705/14 |
| 6,385,619 B1 | * | 5/2002 | Eichstaedt et al. ......... 707/104.1 |

* cited by examiner

Primary Examiner—Sanjiv Shah
(74) Attorney, Agent, or Firm—Frishauf, Holtz, Goodman & Chick, P.C.

(57) ABSTRACT

A computer system is provided that includes a database storing user histories of selected products, and a database associating products with assessments of their content in a number of different categories. The computer system generates user profile data reflecting the underlying characteristics of user preferences by identifying categories and groups of categories corresponding to products in the user histories whose content assessments are one of an extremely high and low evaluation. In the user profile data, larger groups of categories having extremely high or low content evaluations are weighted more heavily than smaller groups of categories and singly identified categories having extremely high or low content evaluations. The generated user profile data can be utilized to provide targeted advertising and/or to automatically select products are identified with similar underlying characteristics of the user. preferences. In one example, a television recording apparatus is provided that automatically records television programs based on a correspondence between program profile data associated with the television programs and user profile data that has been generated based on a past history of the user's viewing habits.

32 Claims, 7 Drawing Sheets

METHOD AND APPARATUS FOR GENERATING PROFILE DATA

This application claims the benefit of provisional application Ser. No. 60/175,899 filed Jan. 13, 2000.

FIELD OF THE INVENTION

The present application relates to a method and apparatus for generating profile data indicative of individuals' personal preferences. In particular, embodiments of the present invention relate to the generation of profile data that indicate the underlying qualities of items selected by a user as derived from a user history.

BACKGROUND OF THE INVENTION

When people buy, rent or use products, they rely on their personal preferences for choosing the products which they buy, rent or use. Where previous purchases, rentals or usage are recorded, purchase or rental histories can be used to determine the personal preferences on which those users rely on for selecting products or services. If a user's personal preferences can be accurately classified, suitable additional products or services can be automatically recommended or advertised to the user which correspond to the user's underlying personal preferences.

Furthermore, to the extent that a users selections are a reflection of the users individual preferences, the profile data also provides a profile of that user in terms of the core values held by that user. The profile data can therefore be used to identify not only products of the same type as those identified in a purchase or rental history but any product or service which can be classified in a similar way reflecting similar core values.

One area in which purchase and rental histories are available is in relation to user selections of entertainment media such as the hiring of videos. A known strategy for automatically recommending videos to users is to classify all videos available for rental in terms of categories such as drama, action, romance, comedy or children's videos and to identify the categories which a users previous selections fall within. When these categories have been identified, other films falling within such categories can be automatically recommended to a user.

A problem with attempting to classify user personal preferences in terms of the broad categories of products within a users purchase or rental history is that such broad categories do not capture individual differences very well. Thus, for example, a video rental history for a given individual may indicate that the individual has selected action films and also comedies and dramas. The personal preferences of such an individual classified in terms of the broad categories of action films, comedies and dramas therefore only serves to reduce slightly the total number of possible products which might be recommended to that individual.

An alternative method of identifying and classifying user personal preferences from user purchase or rental histories is to associate all available products with data indicative of assessments of the products in a range of different categories and to then determine an average profile based on previous selections. This average profile is then taken to be representative of the core values relied upon when selecting products.

However, although such profile data accurately reflects an individual's personal preferences if an individual is consistent about how they select products, frequently individuals will adopt different criteria for selecting products on different occasions with the individual criteria relied upon at times being inconsistent. The effect of averaging these inconsistencies to generate profile data results in the generated profile data not accurately reflecting the true values being relied upon by the individual to make their selections.

Thus, for example, in the case of an individual who at times selects fast paced films and at other times selects slow paced films, a determined average of data indicative of the pace of film selected might indicate that the individual had no particular preference with respect to the pace of films whereas in fact all of the user's selections were in fact made specifically for either extremely fast paced or extremely slow paced films.

There is therefore a need for an alternative method of establishing categorization data classifying individuals personal preferences for products utilizing purchase and rental or similar user selection histories which more accurately classifies the personal preferences of individuals. In particular, there is a need for generating and recording data indicative of a more accurate classification of personal preferences in a way which can be utilized to select further products or services based on the underlying core values of preferences held by an individual.

SUMMARY OF THE INVENTION

In accordance with one aspect of the present invention there is provided a computer apparatus for generating data indicative of underlying qualities of selections made by a user comprising:

- means for receiving user history data identifying a plurality of items selected by a user;
- a selection profile database for storing records associating selectable items with a plurality of category values, each indicative of qualities of said items in respect of a plurality of categories; and
- processing means for processing said profile data associated with items identified within user history data received by said receiving means,
- wherein said processing means generates user profile data comprising data indicative of groups of one or more of said categories, based on a determination of the number of category values associated with said products within said user history determined to fall within predetermined ranges.

In this way, by providing a database that associates selectable items with data indicative of the underlying values embodied by the selectable items, items associated with values within a high or low range can be identified. Identification of values falling within extreme ranges for different categories for items within a user selection history can then be used to generate data indicative of a user's preferences in terms of the number of times high or low values are associated with categories or groups of categories.

The applicants have appreciated that since individuals are not always consistent about the selections they make identifying selections with high or low category ratings provides data which better reflects individual preferences.

Furthermore, the applicants have appreciated that where user selections are associated with a group of different category ratings all indicative of high or low assessments of content in respect of different categories, this combination of categories provides a good representation of the underlying qualities embodied in a selection since the interdependence of different qualities is indicated by such category groups.

In particular, where certain combinations of high and low values for groups of categories appear frequently in data associated with selections within a user history, the most frequently appearing groups provide a more accurate assessment of the personal preferences of a user.

In addition to providing means by which users may be classified by generated profile data, embodiments of the present invention relate to a system for selecting and outputting advertisement data associated with products having profile data similar to the generated profile data. In this way, profile data indicative of values relied upon by a user for selecting previous products can be utilized to direct targeted advertising to users so that the products or services advertised correspond to-products and services which are most likely to appeal to that particular user.

Embodiments of the present invention also relate to a system for selecting products and services on the basis of generated profile data to mimic the selections adopted. For example, a recording apparatus may be provided for automatically recording received television signals on the basis of a comparison of profile data associated with received signals and user profile data generated utilizing user histories of viewed programs, where the profile data comprises groups of categories indicative of underlying qualities of the content of previously viewed programs. Thus, a system can be provided that is adapted to establish user profiles on the basis of data associated with viewed programs and then to automatically record programs identified as corresponding to a generated user profile and thereby record as yet unviewed programs similar to those normally watched to give a user the option of watching such programs at a later date.

DETAILED DESCRIPTION

A first embodiment of the present invention will now be described with reference to FIGS. 1 to 7. This embodiment comprises a computer apparatus for outputting a list of products determined to have similar underlying qualities to products previously selected by an individual.

The present embodiment will be described by way of an illustrative example with reference to selections of video rentals. It will of course be appreciated that the apparatus could be utilized to generate lists of products or services for targeted advertising where records of previous user selections relate to a different types of product or services.

Figure 1:
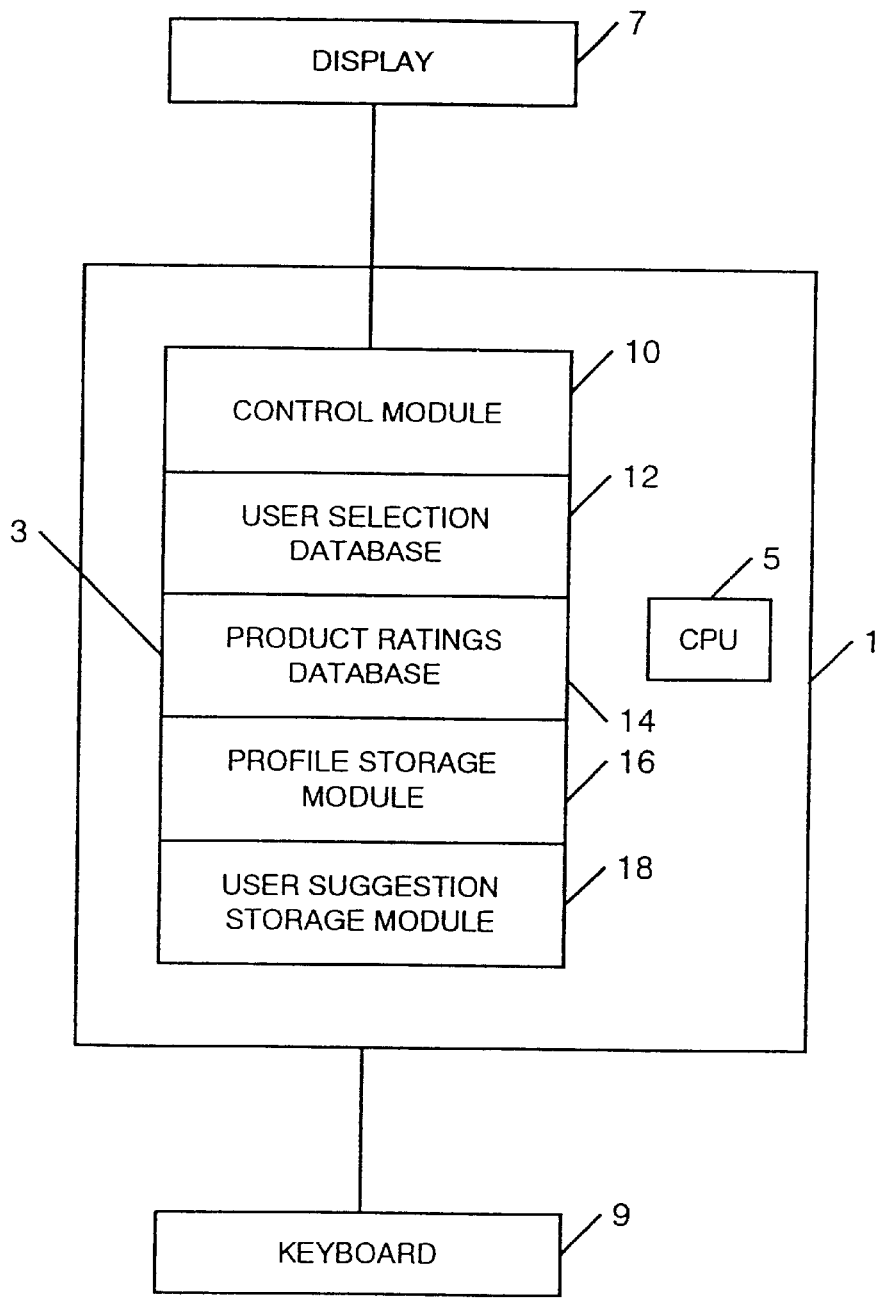
FIG. 1 is a schematic block diagram of a computer apparatus in accordance with a first embodiment of the present invention.

FIG. 1 is a schematic block diagram of a computer apparatus in accordance with this embodiment of the present invention. The computer apparatus comprises a computer 1 having a memory 3 and a central processing unit (CPU) 5. The memory 3 has stored therein programs for controlling the processing of the CPU 5 and data which is processed by the CPU 5. The computer 1 itself is connected to a display 7 for outputting the results of the processing by the CPU 5, and to a keyboard 9 enabling users to input data into the memory 3 of the computer 1.

In this embodiment the memory 3 of the computer 1 has stored therein a control module program 10 for coordinating the processing of the CPU 5; a user selection database 12 for storing records associating previous user selections with user identification data; a product ratings database 14 associating products (in this example video rental films) with a plurality of category values classifying products in relation to a plurality of categories; a profile storage module 16 for storing data indicative of a user profile generated utilizing the user history data and the products ratings data within the user selection database 12 and the product ratings database 14 as will be described in detail later; and a user suggestion storage module 18 for storing data indicative of suggested products generated utilizing profile data stored within the profile storage module 16 and data within the product rating database as will also be described in detail later.

User identification data is input either automatically or via the keyboard 9. The control module 10 then causes the user history data associated with the input user identification data, which is stored as a record within the user selection database 12, to be retrieved. Product ratings data from the product rating database 14 corresponding to products identified within the user history data selected from the user selection database 12 is then utilized to generate profile data identifying categories and groups of categories indicated by high or low values, for example 10–7 or 3–0 in a range 0 to 10, within the product rating records associated with products within the selected user history data. The control module 10 then utilizes the generated profile data stored within the profile storage module 16 to generate lists of suggested products—or targeted advertising data—which are then displayed on the display 7.

By identifying for each product within user history data, products associated with high and low values for classification data and then determining for the entire product history data the number of occurrences of extreme values within a category or occurrences of groups of extreme values data indicative of the personal preferences of that user can be generated.

In particular, by generating data indicative of the presence both high category value data and low category value data associated with products identified within user history data, the generated classification data identifies mutually inconsistent preferences or underlying values relied upon at different times. Thus, for example, if the products within user history data are films which were associated with data indicating that they were extremely fast paced or extremely slow paced, by identifying the occurrence of these extreme values the individual personal preferences would be classified in terms of two mutually inconsistent underlying criteria relied upon on different occasions.

Prior to describing in detail the processing of the control module 10 exemplary data structures for records within the user selection database 12 and the product ratings database 14 will now be described with reference to FIGS. 2 and 3.

Figure 2:
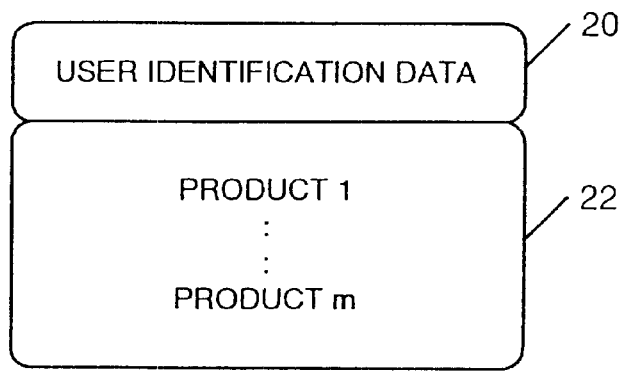
FIG. 2 is a schematic block diagram of an exemplary data structure for records within a user selection database.

FIG. 2 is a schematic block diagram of an exemplary data structure for records within the user selection database 12. The records within the use selection database 12 comprise user identification data 20 and a list of products 22 which a user identified by user identification data 20 has previously selected.

In this example, which relates to generating data classifying individuals on the basis of a user history of previous video rentals, the user identification data 20 might comprise data indicative of a membership number and the list of products 22 would comprise a list of films which the individual associated with the membership number had previously hired.

Figure 3:
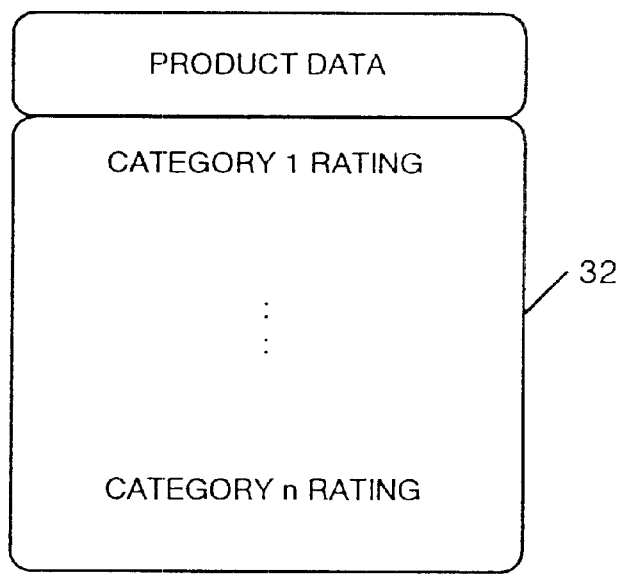
FIG. 3 is a schematic block diagram of an exemplary data structure for records within a products ratings database.

FIG. 3 is a block diagram of an exemplary data structure for records within the products rating database 14. In this embodiment the records within the product database 14 comprise product data 13 identifying a product; and categories rating data 32 comprising n values of category ratings.

The product data 30 serves to identify the records within the product rating database 44, so that they may be related to the product list 22 of records within the user selection database 12. Thus in this way all of the selections made by a user are associated via a record within the user selection database 12 with records in the product ratings database 14 and hence category rating data 32 for n different categories.

In the present example, the product data 30 would correspond to the names of films which can be hired and the category rating data 32 correspond to an assessment of the content of the films in respect of twelve different categories. In the present example, the twelve category ratings comprise values between zero and 10 in which the content of a film is assessed on a sliding scale in respect of the following areas, where an extremely low score is indicative of the content of the film being identified strongly with the first adjective and an extremely high score is indicative of the content of the film being identified strongly with the second adjective, and with values in between corresponding to an assessment between the two adjectives. In the example described hereinbelow, the assessment of content is made in respect of the following categories:

| | | | |
|---|---|---|---|
| 1) HAPPY | - | SAD | |
| 2) FUNNY | - | SERIOUS | |
| 3) SAFE | - | FRIGHTENING | |
| 4) PREDICTABLE | - | SURPRISING | |
| 5) VIOLENT | - | GENTLE | |
| 6) ROMANTIC | - | CRUEL | |
| 7) BEAUTIFUL | - | HORRIFYING | |
| 8) TAME | - | SEXY | |
| 9) SLOW PACED | - | FAST PACED | |
| 10) CONVENTIONAL | - | WEIRD | |
| 11) ESCAPISM | - | CHALLENGING | |
| 12) BLEAK | - | INSPIRATIONAL | |

Thus, for example, records within the product ratings database for three films might be identified by product data being the name of the film and associated category rating data being assessments of the content of the film in the above twelve categories as set out in the following table:

| CATEGORY | GANDHI | RUSH HOUR | SEVEN |
|---|---|---|---|
| 1 | 7 | 10 | 2 |
| 2 | 8 | 8 | 0 |
| 3 | 2 | 7 | 0 |
| 4 | 3 | 5 | 0 |
| 5 | 10 | 6 | 10 |
| 6 | 3 | 4 | 7 |
| 7 | 0 | 6 | 6 |
| 8 | 6 | 3 | 5 |
| 9 | 1 | 8 | 7 |
| 10 | 5 | 0 | 9 |
| 11 | 10 | 2 | 3 |
| 12 | 7 | 10 | 1 |

This example the categories comprise categories suitable for an assessment of the content of a film. It will be appreciated that the categories suitable for indicating an assessment of the content of films would equally be applicable to assessments of other products and services for example books, television programs etc. In general, by providing a product ratings database 14 storing records of the above format, a means is provided to associate with any list of user selection had to derive from the list of user selections 22 and category rating data 32 data indicative of those values relied upon to make the selections within the list 22.

Figure 4:
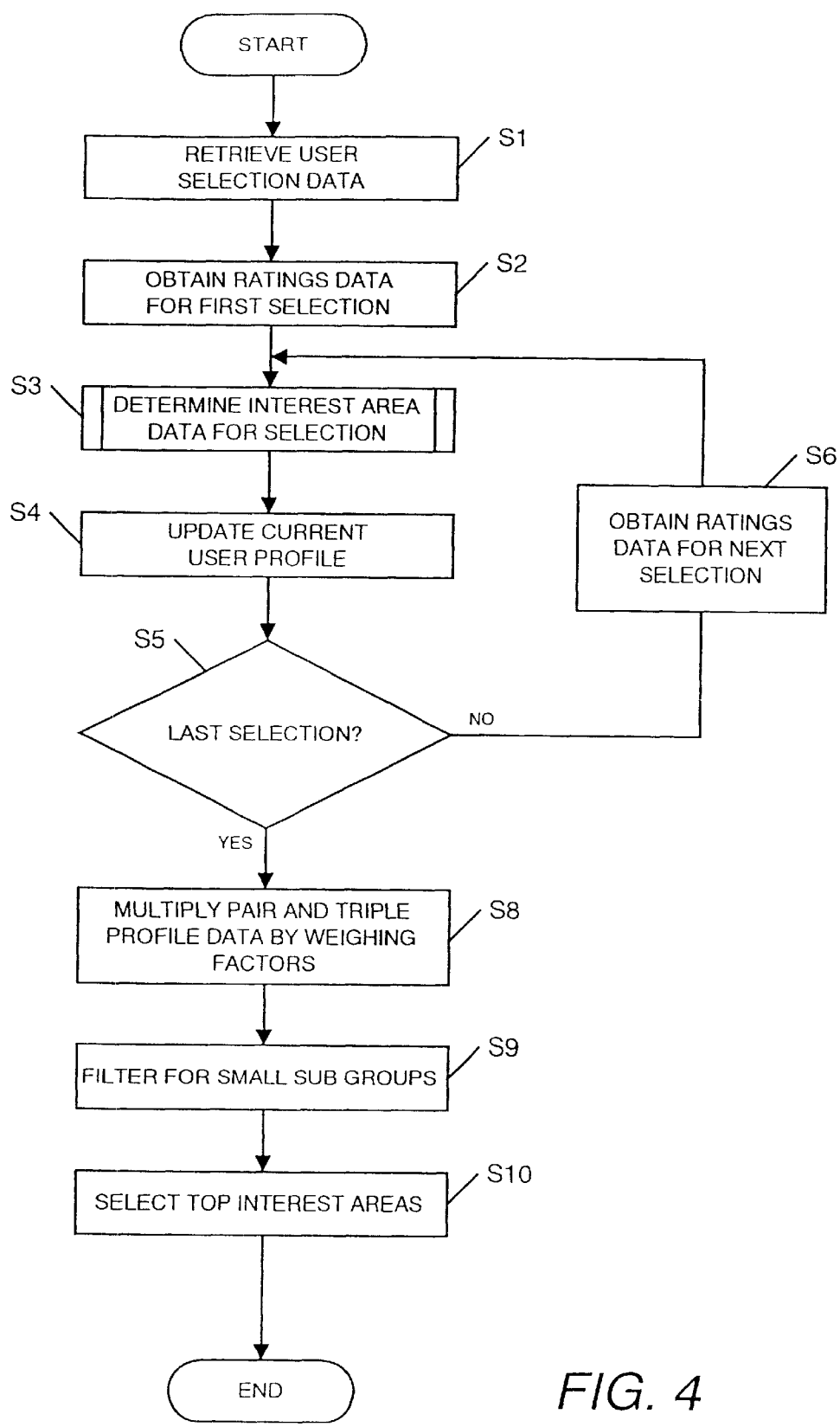
FIG. 4 is a flow diagram of the processing of a control module.

The processing of the control module program 10 to generate data indicative of a classification of a user's personal preferences will now be described with reference to FIGS. 4 to 6.

Following input of data corresponding to user identification data 20 of a record within the user selection database 12 (either automatically or via the keyboard 9), the control module 10 causes (S1) the user selection database 12 to retrieve the record corresponding to the input user identification data 20.

The control module 10 then (S2) causes the CPU5 to utilize the first product within the list of products 22 of the retrieved record to identify the record within the products rating database 14 corresponding to the first item on the list 22.

The category rating data 32 associated with the product data 30 corresponding to the first product within the list 22 of the selected user record is then (S3) processed to identity values within the category rating data 32 for the selected record from the products rating database 14 corresponding to high and low ratings and groups of high and low ratings as will be described later with reference to FIG. 5

The identified high and low category ratings and the groups of category ratings are then utilized (S4) to amend user profile data stored within the profile storage module 16 which identifies a running total number of occurrences of high or low values of category ratings within product records processed by the control module 10 for each category and group of categories as will be described in detail later.

The control module 10 then (S5) determines whether the product data 30 of the product record which has been processed was the last of the products on the product list 22 associated with the retrieved user selection data.

If it is determined that the product data 30 processed was not the last item of product data on the list of products .22 the control module 10 causes (S6) the CPU 5 to select from the product rating database 14 the record having product data 30 corresponding to the next item of the list 22 of the retrieved user selection record. The control module 10 then processes the category rating data 32 associated with this next item of data within the list 22 to determine (S3) data indicative of the presence of high and low ratings and groups of high and low ratings in the newly retrieved record which are then used to update (S4) the content of the profile storage module 16, before once again (S5) determining whether the final item on the list 22 of the record retrieved from the user selection database 12 has been reached.

Thus in this way the category rating data 32 of records within the products rating database 14 corresponding to each of the items within the list of products 22 for the retrieved record corresponding to the input user identification data is processed to identify categories and groups of categories corresponding to high and low ratings within the category rating data 32 which are utilized to update the profile data stored within the profile storage module 16. The profile data within the storage module 16 therefore is indicative of the total number of occurrences of high and low ratings and groups of ratings for all of the category rating data 32 for each of the products within the list of products 22 associated with the input user identification data.

Figure 5:
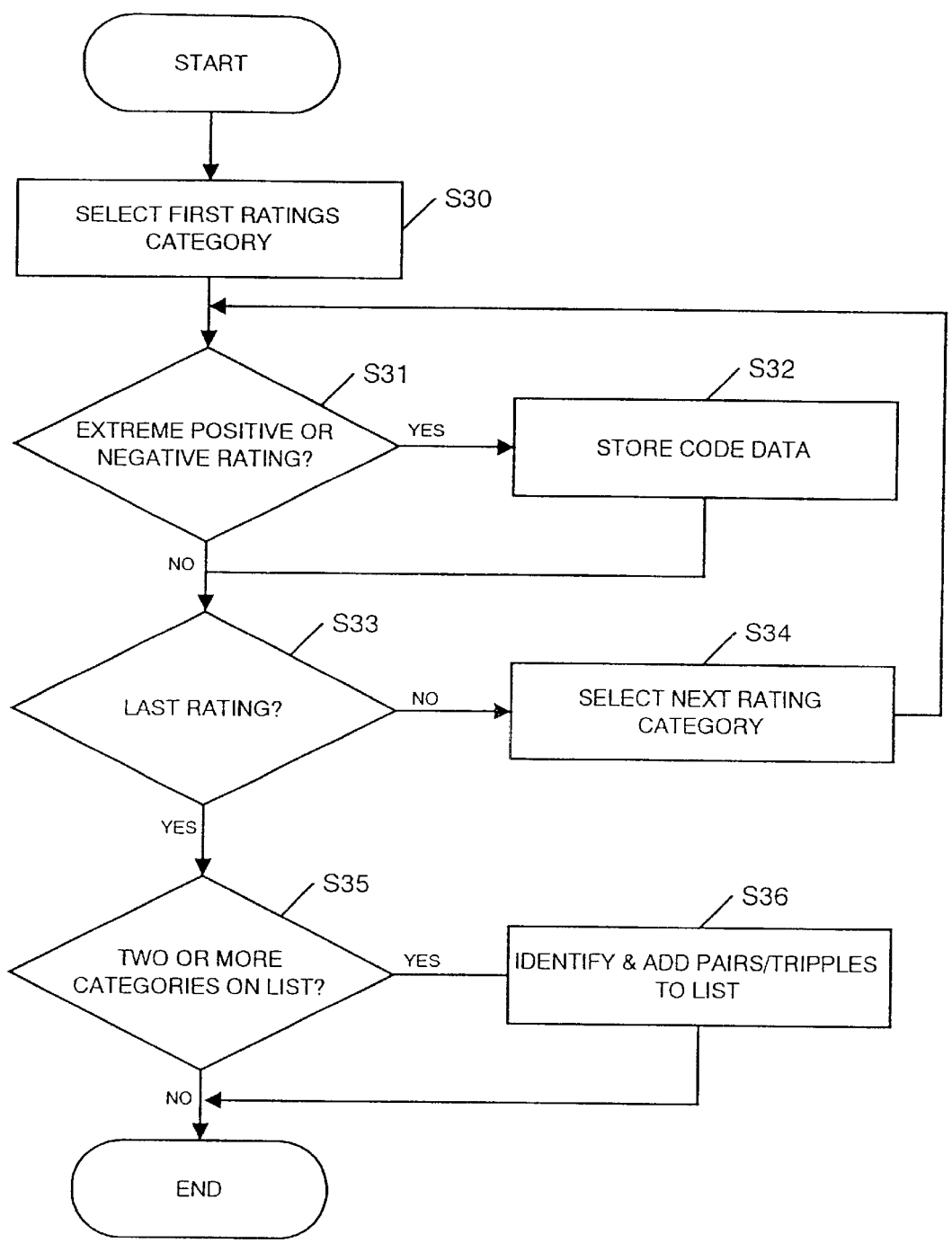
FIG. 5 is a flow diagram of the processing of a control module generating interest area data.

FIG. 5 is a flow diagram illustrating in detail the processing of category rating data 32 for a product record within the product ratings database 14 to generate data utilized to update profile data stored within the profile storage module 16.

Initially (S30) the control module 10 causes the CPU 5 to select the first of the n items of category rating data 32 associated with the record retrieved from the products ratings database 14. The control module 10 then (S31) determines whether the category rating selected constitutes an extremely high or an extremely low value for the range of possible values for that category rating. For the sake of simplicity, in this example this is achieved by determining whether the category rating under consideration constitutes either 10 or 0.

If the category rating under consideration is determined to constitute an extremely high value or an extremely low value the control module 10 then causes the CPU 5 to store (S32) within the memory 3 data indicating that data in the category currently under consideration constitutes either a high value or a low value. Thus in this way the control module 10 converts the category rating data 32 which comprises data indicative of an assessment of content between two extremes into data indicative of the extreme assessments associated with a product. Thus, for example, data indicative of a value of 10 in a range of 0–10 for a category assessing content on a scale between 0 indicative of happy and 10 indicative of sad is converted into data merely indicative of the content being assessed as being sad.

In this embodiment, this is achieved by the control module 10 causing the CPU 5 to store in the memory 3 a code number where the number corresponds to k for the kth category of category rating data 32 if the extreme value is determined to be 0 or k+n for the kth category if the category rating value thereof is determined to be 10. Each item of category rating data 32 identified as being either a high or low value is therefore converted from a rating indicative of a value on one of the n scales of assessments between two polar opposite assessments of content into one of 2n code numbers identify the category extreme indicated by the item of ratings data.

Thus, in this example, where films are assessed in 12 categories code numbers 1–12 are generated when a category rating of 0 is detected and code numbers 13–24 are generated when a category rating of 10 is detected. The code numbers 1–12 are therefore indicative of assessments of content corresponding to the first of the adjectives in the category ratings scales and code numbers equal to 13–24 are indicative of content corresponding to the second adjectives in the category ratings scales.

Thus, for example, where a 1st category rating of 12 category ratings is indicative of a scale between extremely happy and extremely sad and a ratings value of 10 is detected, data code data equal to 1+12=13 is stored within the memory 3 to indicate that the product under consideration has been assessed and has been associated with category rating data 32 indicating that its content is extremely sad. Similarly, if the $5^{th}$ category is indicative of a scale between extremely gentle and extremely violent and a ratings value of 0 is detected, code data equal to 5+0=5 is stored in the memory to indicate that the product under consideration is assessed and has been associated with category rating data indicating that its content is extremely gentle.

After, if necessary, data has been stored for a category rating determined to be an extreme value, the control module 10 then causes the CPU 5 to determine (S33) whether the category rating currently under consideration from the selected product ratings database record is the last of the category rating data 32 for that record.

If this is not the case the control module 10 causes the CPU 5 to select (S34) the next category rating data 32 and repeats its determination of whether the selected category rating constitutes a high or low rating (S31) and records (S32) further data indicating the extreme category indicative of that extreme value if the category rating data 32 is determined to be extremely high or extremely low.

This determination is then repeated for each of the category rating data 32 of the selected record until the CPU 5 determines (33) that the final rating of the category rating data 32 of the selected record has been reached.

In this way data is recorded within the memory 3 indicating any extreme category value ratings associated with a film in the form of data indicative of which categories have been determined to correspond to the detected extreme values, and whether those extreme values are either extremely high or extremely low.

Thus for example in the case of the film Gandhi associated with product ratings as set out above where high values are associated with categories 5 (violent/gentle) and 11 (escapism/challenging) and a low value is associated with category 7 (beautiful/horrifying), the data in the memory would comprise three numbers, 17=5+12, 7=7+0 & 23=11+12, indicating that the film had been assessed as extremely gentle, beautiful and challenging.

After this data has been generated, the control module 10 then (S35) determines whether the data generated utilizing the category rating data 32 of the selected record comprises more than a single stored value, indicating that more than one extreme value was included within the category rating data 32 associated with the currently selected record. If it is determined more than one code value has been stored the control module 10 then causes the CPU 5 to generate (S36) data indicating the pairs and triples of extreme of categories that have been detected.

Thus for example in the case of a film associated with category values indicating that it is an extremely gentle, beautiful and challenging film for which code values have been stored within the memory the CPU 5 would additionally generate utilizing these code values, data comprising further code values indicating that the film was associated with the pairs of extreme categories indicated namely gentle/beautiful, gentle/challenging and beautiful/challenging together with further code data and indicative of the triple of categories gentle/beautiful/challenging.

Thus at this stage the memory 3 has stored therein code values indicating the extreme categories identified as appearing within the category rating data 32 for the currently selected record from the product ratings database 14, together with data indicative of pairs of extreme categories and triples of extreme categories indicated by category rating data 32 within the selected record, which are utilized to generate profile data as will now be described.

Figure 6:
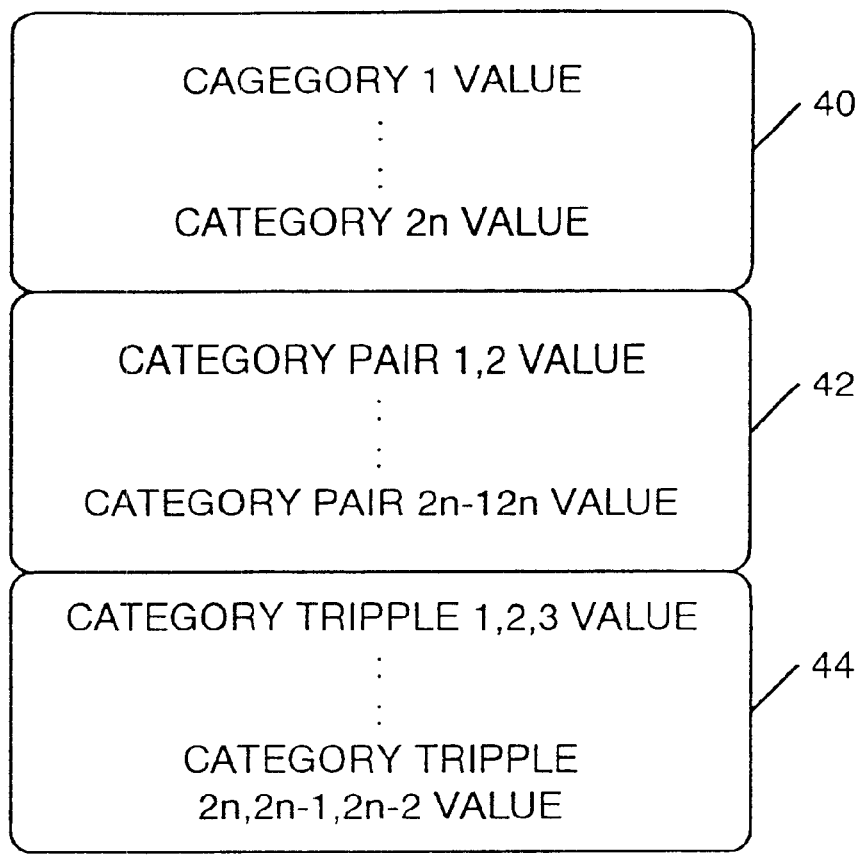
FIG. 6 is a schematic block diagram of an exemplary data structure for user profile data.
Figure 7:
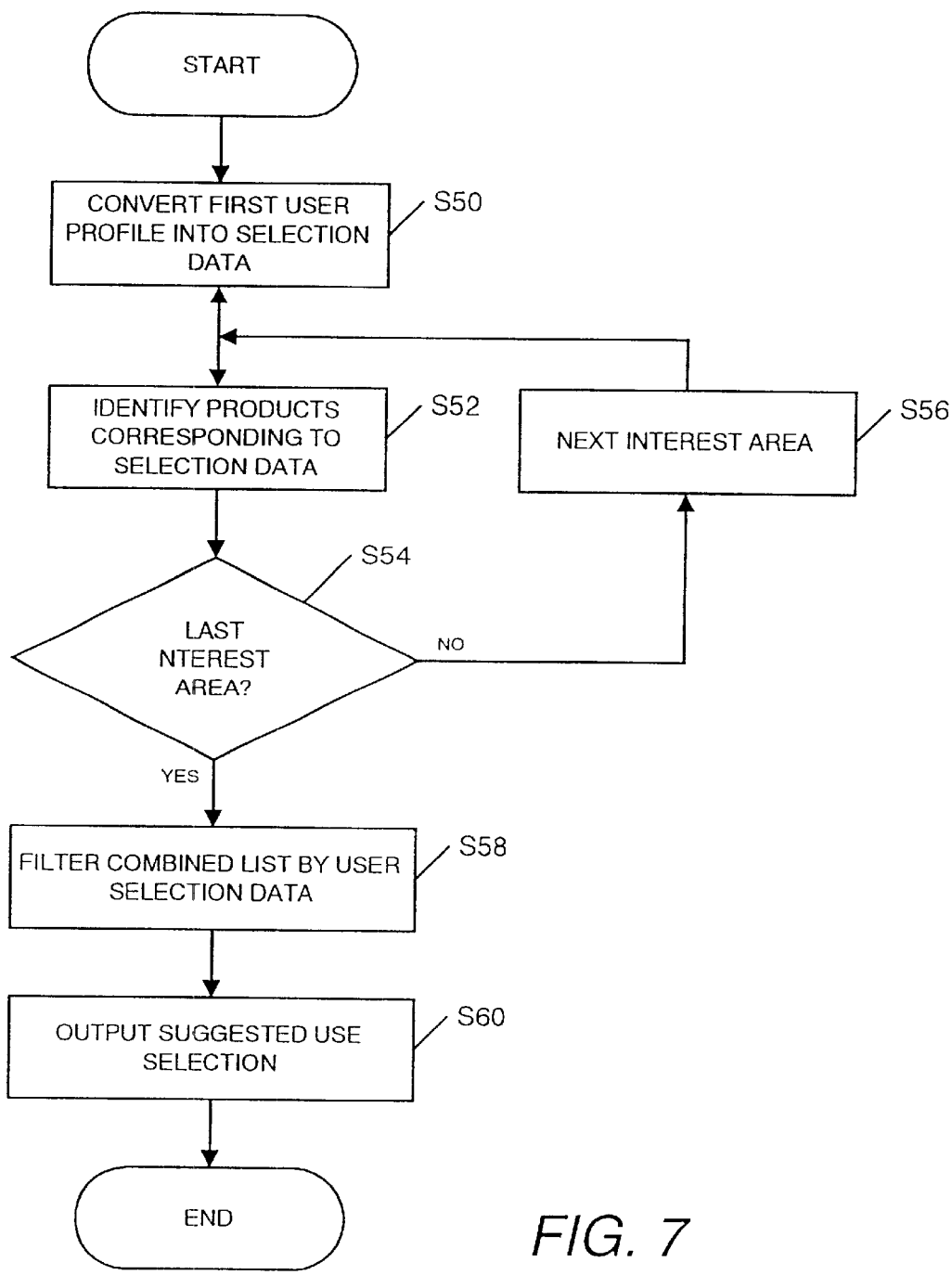
FIG. 7 is a flow diagram of the processing of a control module for generating suggestion data.

FIG. 6 is a schematic block diagram of an exemplary data structure for storing data within the profile storage module 16 in accordance with this embodiment. The data comprises 2n values indicative of the presence of very positive and very negative qualities associated with products; 2n(2n−2) values indicative of the presence of possible pairs of high or low categories identified as being present within ratings data 32 and 2n(2n−2)(2n−4) items of data 44 indicating the presence of possible combinations of possible three high or low values within category rating data 32 of products rating data of products associated with a user.

In this embodiment, each of the items of data 42–46 comprises a value indicative of the number of times a high or low category, high or low category pair of high or low category triple is represented within the product list 42 of the user under consideration. In this embodiment, this is achieved by utilizing the code values stored within the memory 3 to select items of profile data 42–46 which are then incremented to reflect the detection of further extreme category values for products associated with a user.

Thus, for example, in the case of a product associated with category rating data 32 identifying the product to be extremely gentle, beautiful and challenging, values within the category values 40 indicative of the presence of these categories would all be incremented by one as would values within the category pairs data 42 corresponding to the pairs of values gentle/beautiful, beautiful/challenging, gentle/challenging within the category pair data 42 and data within the category triple data 44 indicative of the presence of the category triple gentle/beautiful/challenging would also incremented.

Thus in this way the profile data within the profile storage module 16 represents a running total the number of times high or low values for the categories, category pairs and category triples are detected within the category rating data 32 for the product ratings records associated with the list of products 22.

Returning to FIG. 4, when all of the product rating records associated with the list of products 22 have been processed the profile data 40–44 stored within the profile storage module 16 will indicate the total number of times each high or low categories pairs of high and low categories and category triples have been identified within any of the records associated with the products 22 indicated by the user history.

In this embodiment the control module 10 then (S8) determines a weighted value for the number of occurrences of category pairs and category triples by multiplying each item of data 42 associated with category pair values by a first rating factor and by multiplying each of the values of data indicative of the presence of category triples 44 by a second rating factor. In this embodiment the rating factor used to weight the presence of data indicative of category pairs is set to be equal to 3.2 and the weighting factor for the presence of category triples is set to equal to 4.8. In this way greater weight is given to the presence of category pairs and category triples since the presence of two or more extreme values better classifies an individual's preferences than the presence of an extreme value for a single category alone.

The control module 10 then (S9) sets, for each of the category triples associated with data 44 indicating that the category triple has been identified within the category rating data 32 of products selected by an individual is associated with a value which is greater than zero, the values associated by data associated with pairs 42 and individual categories 44 within sub-groups within that triple to zero. Thus for example if data associated with the presence of extreme values for ratings of gentle/beautiful/challenging are detected control module sets data associated with the category pairs gentle/beautiful, beautiful/challenging and gentle/challenging to zero. This is then repeated for the individual values 40 for the categories making up the triple. The same procedure is then repeated using values associated with category pairs 42.

Thus in this way the profile data within the profile storage module 16 is filtered so that where pairs and individual values appear as part of larger groups, data indicative of the presence of those larger groups is utilized to classify an individual search strategy rather than utilizing the individual occurrence of pairs of categories themselves.

The control module 10 then (S10) outputs as a classification of a user a predetermined number of categories, category pairs and category triples which associated with the greatest values within the profile data 40,42,44 stored within the profile storage module 16. This data is then indicative of a classification of the users preferences in terms of the underlying values associated with the products previously selected by that user.

Thus, for example, after processing category rating data 32 for products associated with an individual a user utilizing the categories described previously might be identified as having as four core underlying values for selecting films which are:

1. sad/serious/bleak
2. serious/tame/challenging
3. frightening/tame
4. horrible With profile data identifying these categories, pairs and triples are output accordingly.

In this embodiment, the profile data is then used to select from the product ratings database 14 products which match the generated profile data. Thus in this way, the determined user profile can be utilized to select products for targeted advertising to a user.

Although in this example, the same product rating database 14 is used to both generate a user profile and to select products for recommendation to a user, it will be appreciated that since the user profile generated is indicative of the preferences of a user in terms of underlying values of products or services, the profile data could be used to select products or services for recommendation from any suitable database and thus the user profile could be utilized to target advertising for any type of product or service whose underlying values can similarly be quantified. The processing of the control module 10 will now be described with reference to FIG. 7.

Initially (S50) the control module generates from the generated profile data, search data for searching the product database 40.

In this embodiment the search data comprising n values corresponding to the n category ratings of records within the product ratings database 14 is generated by the control module 10 comprising a value equal to 5 for category ratings where the category does not appear within categories and groups of categories in the generated user profile, a value of zero for category rating data where data classifying the user search strategy is indicative of extremely low values having been identified, and a value of 10 for category ratings from the profile data indicates that very high ratings have been identified.

This search data is then (S52) utilized to identify product data 30 associated with ratings data which closely corresponds to the generated search data. In this embodiment this is achieved by the control module 10 causing the CPU 5 to determine a value indicative of the sum of the absolute values of differences between the generated search data for a category rating and category rating data 32 for the same category within the category rating data 32 for each of the records within the product ratings database 14. The control module 10 then selects as records corresponding to the search data those records associated with values lower than a preset threshold value. The product data 30 for these records is then added to a list which is stored in the user suggestions storage module 18 of the memory 3.

The control module 10 then (S54) causes the CPU 5 to determine whether the category or group of categories used to generate search data corresponds to the last of the categories or group of categories in the user profile.

If this is determined not to be the case, the control module 10 then selects the next of the categories or groups of categories (S56) and then generate further search data which is used (S52) to identify products corresponding to the newly generated search data in the same manner as has been previously described. The control module 10 then (S54) once again determines whether the latest category or group categories utilized to generate search data corresponds to the last of the categories or group of the categories used to classify a user selection strategy.

Thus in this way the control module 10 causes to be stored within the user suggestion storage module 18 a list of products corresponding to product data 30 of records associated with category rating data 32 closely corresponding to any search data generated utilizing all of the different categories and groups of categories classifying the users personal preferences.

When the control module 10 determines (S54) that product data has been stored within the user suggestions storage module 18 for search data corresponding to the last category or groups of categories in the generated profile the control module 10 then (S58) filters the generated list by comparing each item in the lists stored within the user suggestion storage module 18 with the list of products 22 associated with the input user identification data 20 used to generate data indicative of a user selection strategy and removing from the list stored within the user suggestion storage module 18 any products corresponding to products within the list 22 for the record from the user selection database 18. Thus in this way the list generated is filtered to remove references to products which have already been obtained by that user.

The control module 10 then identifies within the list any items of product data which appear more than once within the list and deletes these duplicates from the list. The control module 10 then causes the filtered list to be displayed (S60) on the display 7 thereby showing to a user a list of products identified as corresponding to the classification of a user's personal preferences which the user has not previously purchased or rented.

Figure 8:
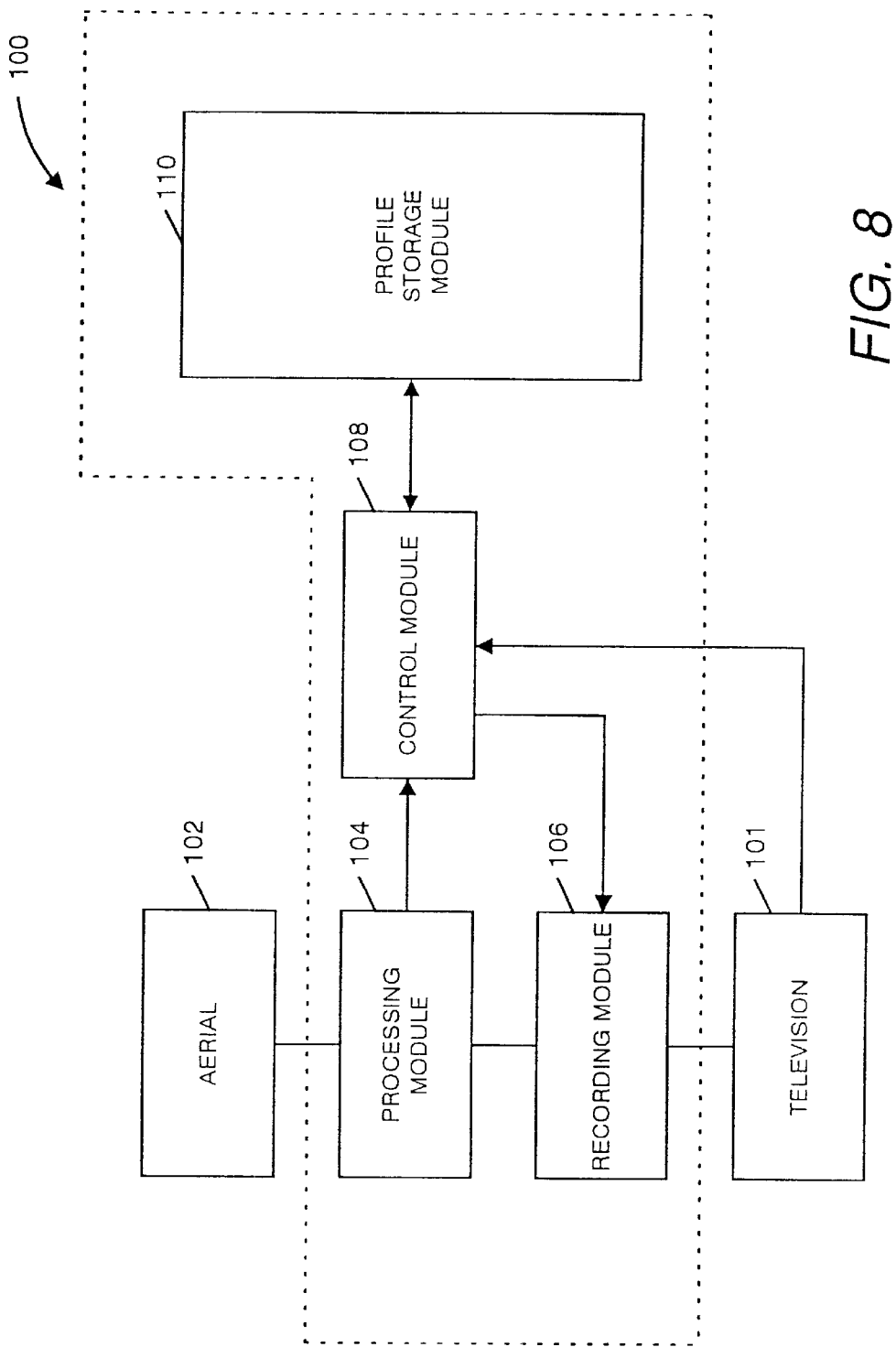
FIG. 8 is a schematic block diagram of a second embodiment of the present invention.

FIG. 8 is a schematic block diagram of a second embodiment of the present invention. This embodiment comprises a recording apparatus 100 for selectively recording received video signals on the basis of user profile data generated on the basis of a determination of the content of programs previously viewed by a user, where a user's previous viewing habits are classified by profile data in a similar manner to that previously described in relation to the first embodiment.

In accordance with this embodiment, the recording apparatus 100 is connected to a television 101 and an aerial 102. The aerial 102 receives broadcast signals for a number of different channels which are passed via the recording apparatus 100 to the television 101 where the signals may be viewed as a television program. Of course, the broadcast signals can also be received via a cable or telephone line.

In this embodiment, moreover, the television signal received by the aerial 102 includes profile data comprising data indicative of an assessment of the content of the transmitted television program for each of the channels in respect of a number of different categories, in the manner that has previously been described in relation to the first embodiment. The recording apparatus 100 is arranged also to receive data from the television 101 indicating whether the television 101 is switched on and which channel is being viewed on the television 101.

As will be described later, the recording apparatus 100 generates a user profile based on the profile data received via the aerial 102 when the recording apparatus 100 detects that the television 101 is switched on and displaying a program. When the recording apparatus 100 detects that the television 101 is not switched on and displaying a program, the recording apparatus 100 utilizes received profile data to determine which received programs are associated with profile data strongly corresponding to the stored user profile indicative of programs which have been displayed by the television 101. Where the profile data of a received program corresponds strongly to the user profile stored within the recording apparatus 100 the recording apparatus 100 records that program in a memory, so that the recorded program may be viewed at a later date.

In this embodiment of the present invention, the recording apparatus 100 comprises a processing module 104 arranged to receive a signal from the aerial 102 and separate profile data from a received signal from video signals for generating pictures on a television screen. The processing module 104 is connected to a recording module 106 for recording video signals and a control module 108. The control module 108, itself is also arranged to receive the signal from the television 101 indicating whether the television is switched on and which channel the television 101 is tuned to. The control module 108 is also connected to the recording module 106 and to a profile storage module 110.

In use, when a television signal is received by the aerial 102, it is passed to the processing module 104 which separates video signals from profile data encoded within the signal received by the aerial 102. The processing module 104 then passes the profile data to the control module 108 and transmits the video signals via the recording module 106 to the television 101.

In addition to receiving profile data from the processing module 104, the control module 108 also receives a signal from the television 101 indicating whether the television is switched on and displaying a program and which channel the television is tuned to. If the control module 108 receives a signal from the television 101 indicating that the television is switched on, the control module 108 causes profile data of the program on the channel to which the television 101 is tuned to be stored within the profile storage module 110. Thus in this way for each program that is selected by a viewer to be displayed on the screen of the television 101, profile data is stored within the profile storage module 110 and a user history of programs viewed is thereby generated.

When the control module 108 receives a signal from the television 101 indicating that the television 101 is switched off and is not displaying a program, the control module 108 generates user profile data and search data from the profile data stored within the profile storage module 110 in a similar manner to that which has been described previously in relation to the first embodiment.

When the control module 108 then receives profile data from the processing module 104 the control module 108, compares the received profile data 104 with search data generated from the user profile as has been previously described in relation to the first embodiment. Where received profile data for a program received by the aerial substantially corresponds to search data generated by the control module 108, the control module 108 generates a control signal which causes the recording module 106 to record the received display signal for the program.

Thus in this way when programs are not being viewed by an individual on the screen of the television 101 the recording apparatus 100 automatically records programs having profiles corresponding to the users normal selections as indicated by the generated user profile.

Although in the above embodiments an apparatus has been described in which generated profile data is utilized to generate search data which causes the output of a list of products or services, it will be appreciated that the profile data could itself be output onto a disk or other recording medium or via a network to another computer apparatus where processing to determine user recommendations could occur.

And although in the above described embodiments data indicative of high or low values of category rating data associated with products is generated utilizing stored category rating data, it will be appreciated that such high or low value category data identifying categories or groups of categories having high or low values could instead be stored directly in association with products and services and that such stored data could be utilized with a list of previous user selections to generate profile data.

In addition, although in the above embodiments high or low values have been described as corresponding respectively to zero or ten on a scale between zero and ten, other values could be classified as high or low values—such as, for example, the range of values from zero to three or seven to ten could be classified as low and high values respectively. And where a range of values is used to identify which category ratings correspond to high or low values for the generation of profile data, it will be appreciated that the different ratings could be used to generate profile data of different weights for different values defined to constitute high or low values. For example, determination of the presence of a value corresponding to zero might be given a weight of two as a low value while the detection of category data corresponding to the value of three might be given a weight rating value 0.5, with values between zero and three being given rating values between these two so that where products are associated with values which are not at the extreme range of category ratings less relance is placed upon that data for generating user profile data.

Still further, although in the above embodiments description has been made of a system generating profile data comprising categories and groups of categories where none of the categories or smaller groups of categories are included within larger groups, it will be appreciated that all of the identified categories and groups of categories corresponding to high and low values could be output as user profile data.

In the above described embodiments, moreover, the total number of the occurrences of high or low values for categories or groups of categories within rating data associated with user identification data is utilized to select a predefined number of such categories or category groups. It will be appreciated, however, that the total number of occurrences of high and low values could also be used to determine search data utilizing the identified categories and category groups. For example, where a high proportion of selections identified with a particular category or group of categories, such data utilizing the profile data could be made to correspond to more extreme selection than where a lower proportion of selections correspond to an identified category or groups of categories.

Although in the previous embodiments search data has been described as being generated to enable similar products to a users defined selection strategy to be recommended to a particular user by selecting records from within a product record database, other methods could be used to generate user recommendations. For example, user profiles of a number of different users could be generated in the manner previously described and lists of products selected by users associated with similar user profiles could be utilized to generate lists of recommendations for another user. This technique is generally referred to as collaborative filtering, and can be used in conjunction with the above described recommendation method of the present invention.

Alternatively, in addition to providing user identification data identifying individual users, further data, identifying characteristics of individual users could also be stored. For example, data identifying the age or gender of users could be stored and selection strategies adopted by users falling within groups defined. Such additional data could then be utilized to recommend to users within groups identified by the additional data products and services based upon profile data generated utilizing selection data for those groups of individuals.

And finally, although the present invention has described with reference to the drawings as comprising a computer apparatus and processes performed in computer apparatus, the invention also extends to computer programs, and particularly to computer programs on or in a carrier adapted for putting the invention into practice. The program may be in the form of source or object code or in any other form suitable for use in the implementation of the processes according to the invention. The carrier, moreover, may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. And when the program is embodied in a signal which may be conveyed directly by a cable or other device or means, the carrier may be constituted by such cable or other device or means. Alternatively, the carrier may be an integrated circuit in which the program is embedded, with the integrated circuit being adapted for performing, or for use in the performance of, the relevant processes.

Additional advantages and modifications will readily occur to those skilled in the art. Therefore, the invention in its broader aspects is not limited to the specific details, representative systems, and illustrated examples shown and described herein. Accordingly, various modifications may be made without departing from the spirit or scope of the general inventive concept of the-present invention as defined by the appended claims and their equivalents.

I claim:

1. A computer system comprising:
   receiving means for receiving selection data identifying a plurality of selections made by a user;
   association means for associating category rating data with the plurality of selections, said category rating data comprising an evaluation of content in terms of underlying qualities of each the plurality of selections in each of a plurality of categories; and
   user profile generation means for generating user profile data based on a number of times the category rating data in at least one of the categories reflects one of a high and low evaluation.

2. The computer system according to claim 1, wherein the user profile generation means comprises means for identifying groups of categories that are associated with respective ones of the plurality of selections and whose category rating data each reflect one of a high and low evaluation, and the user profile generation means generates the user profile data also based on a number of times said groups of categories are identified.

3. The computer system according to claim 2, wherein the user profile data generated by the user profile generation means is weighted to emphasize said groups of categories in accordance with a number of categories within each of said groups, such that a group of categories having a larger number of categories therein is more heavily weighted than a group of categories having a fewer number of categories therein.

4. The computer system according to claim 1, further comprising a selection means for utilizing the user profile data to identify an output item having classification data corresponding to the user profile data.

5. The computer system according to claim 4, wherein the output item comprises one of: (i) a television program to be recorded, and (ii) a targeted advertisement.

6. A method of generating user profile data comprising:
   receiving selection data identifying a plurality of selections made by a user;
   associating category rating data with the plurality of selections, said category rating data comprising an evaluation of content in terms of underlying qualities of each the plurality of selections in each of a plurality of categories; and
   generating the user profile data based on a number of times the category rating data in at least one of the categories reflects one of a high and low evaluation.

7. The method according to claim 6, further comprising identifying groups of categories that are associated with respective ones of the plurality of selections and whose category rating data each reflect one of a high and low evaluation, and wherein the user profile data is generated also based on a number of times said groups of categories are identified.

8. The method according to claim 7, wherein the user profile data is weighted to emphasize said groups of categories in accordance with a number of categories within each of said groups, such that a group of categories having a larger number of categories therein is more heavily weighted than a group of categories having a fewer number of categories therein.

9. The method according to claim 6, further comprising utilizing the user profile data to identify an output item having classification data corresponding to the user profile data.

10. The method according to claim 9, wherein the output item comprises one of: (i) a television program to be recorded, and (ii) a targeted advertisement.

11. A computer apparatus comprising:
    receiving means for receiving selection data identifying a plurality of selections made by a user;
    association means for associating with said plurality of selections, data identifying categories in which content of the respective selections of said plurality of selections have been evaluated in terms of underlying qualities of said plurality of selections, where said evaluations correspond to evaluations within predetermined ranges for said categories; and
    user profile generation means for generating user profile data utilizing determined totals for different categories of a number of times evaluations within said predetermined ranges are associated with received data by said association means.

12. The computer apparatus of claim 11, wherein:
    said receiving means comprises storage means for storing records associating user identification data with selection data identifying a plurality of selections made by one or more users; and
    said receiving means is arranged to receive user identification data and retrieve from said storage means selection data corresponding to the received identification data.

13. The computer apparatus of claim 12, wherein:
    said association means comprises database means for storing a plurality of records associating a plurality of selections each with classification data comprising data indicative of an assessment of the content of said selection with respect to a plurality of categories; and
    determination means for determining and associating selections with categories corresponding to predetermined ranges indicative of high or low evaluation by said records associated with said selections.

14. The computer apparatus of claim 13, further comprising selection means for utilizing the user profile data generated by the user profile data generation means to identify further selections associated with data by said association means.

15. The computer apparatus of claim 14, wherein said selection means comprises search data generation means for generating search data utilizing said user profile data, and selection output means for outputting data associated with classification data within said database means associated with classification data substantially corresponding to said search data generated by said search data generation means.

16. The computer apparatus of claim 15, wherein said selection means is arranged to determine a correspondence between said search data and said classification data base on a determination of a value indicative of a sum of absolute values of differences between said search data for a category and said classification data for the same category for at least some of said plurality of categories.

17. A method in accordance with claim 12, wherein said receiving step comprises the steps of:
    storing records associating user identification data with selection data identifying a plurality of selections made by one or more users;
    receiving user identification data; and
    retrieving from said stored records selection data corresponding to received identification data.

18. A method in accordance with claim 17, wherein said association step comprises the steps of:
    storing a plurality of records associating a plurality of selections each with classifications data comprising data indicative of an assessment of the content of said selection in respect of a plurality of categories; and determining and associating selections with categories corresponding to predetermined ranges indicative of high or low evaluation by said records associated with said selections.

19. A method in accordance with claim 18, further comprising a step of selecting data associated with data identifying categories by said associating step, by utilizing said profile data generated by said generating step.

20. A method in accordance with claim 19, wherein said selecting step comprises the steps of generating search data utilizing said user profile data, and outputting data associated with classification data substantially corresponding to said generated search data.

21. A method in accordance with claim 20, wherein said outputting-step comprises determining a correspondence between said search data and said classification data based on a determination of a value indicative of a sum of absolute values of differences between said search data for a category and said classification data for the same category for at least some of said plurality of categories.

22. The computer apparatus of claim 11, wherein:

said user profile generation means comprises means for identifying groups of categories associated with respective selections of said plurality of selections corresponding to groups of categories associated with evaluations within said predetermined ranges; and said user profile generation means is operable to generate the user profile data utilizing determined totals of the number of times groups of evaluations within said predetermined ranges are associated with received data.

23. The computer apparatus of claim 22, wherein said user profile generation means is arranged to determine weighted totals for the total number of times evaluations within said predetermined ranges of different categories or groups of categories are associated with received data, in a manner such that different weighted totals are determined for different sizes of groups of categories.

24. The computer apparatus of claim 22, wherein said user profile generation means is arranged to output as the user profile data, data indicative of categories and/or groups of categories associated with highest determined totals of evaluations within said predetermined ranges for different categories or groups of categories.

25. A recording apparatus for selectively recording received data comprising:

input means for receiving a plurality of items of data each associated with profile data identifying categories in which content of said items of data have been evaluated within predetermined ranges in terms of underlying qualities of said items of data;

determination means for determining which of said items of data are utilized by a user, and for generating selection data based on said determination;

user profile generation means for generating user profile data utilizing determined totals for different categories of a number of times evaluations within said predetermined ranges are associated with the generated selection data; and recording means for selectively recording respective ones of the received items of data based on a correspondence between the profile data associated with the received items of data and the user profile data generated by the user profile generation means.

26. A method of generating user profile data comprising the steps of:

receiving selection data identifying a plurality of selections made by one or more users;

associating with said plurality of selections, data identifying categories in which content of the respective selections of said plurality of selections have been evaluated in terms of underlying qualities of said plurality of selections, where said evaluations correspond to evaluations within predetermined ranges for said categories; and generating user profile data utilizing determined totals for different categories of a number of times evaluations within said predetermined ranges are associated with said received data.

27. A method in accordance with a claims 26, further comprising the step of identifying groups of categories associated with respective selections of said plurality of selections corresponding to groups of categories associated with evaluations within said predetermined ranges, and wherein said step of generating user profile data comprises utilizing determined totals of a number of times groups of evaluations within said predetermined ranges are associated with received data.

28. A method in accordance with claim 27, wherein said generation step comprises determining weighted totals for the total number of times evaluations within said predetermined ranges of different categories or groups of categories are associated with received data, in a manner such that different weighted totals are determined for different sizes of groups of categories.

29. A method in accordance with claim 27, further comprising outputting as the user profile data, data indicative of categories and/or groups of categories associated with highest determined totals of evaluations within said predetermined ranges for different categories or groups of categories.

30. A method of selectively recording received data comprising:

receiving a plurality of items of data each associated with profile data identifying categories in which content of said items of data have been evaluated within predetermined ranges in terms of underlying qualities of said items of data;

determining which of said items of data are utilized by a user, and generating selection data based on the determination;

generating user profile data utilizing determined totals for different categories of a number of times evaluations within said predetermined ranges are associated with the generated selection data; and selectively recording respective ones of the received items of data based on a correspondence between the profile data associated with the received items of data and the generated user profile data.

31. A recording apparatus for selectively recording television programs comprising:

means for receiving signals for a plurality of television programs each associated with profile data identifying categories in which content of said programs has been evaluated within predetermined ranges for said categories in terms of underlying qualities of said programs;

means for determining which of said plurality of programs have been displayed by a user, and for generating user profile data utilizing determined totals for different categories of a number of times evaluations within said predetermined ranges are associated with the displayed programs; and recording means for selectively recording programs that have not yet been displayed by the user, based on a correspondence between said profile data associated with said programs and said generated user profile data.

32. An apparatus for outputting targeted advertising comprising:

means for receiving user profile data comprising categories or groups of categories;

means for generating search data utilizing said received profile data;

means for storing advertising data in association with data identifying categories in which content of items represented by said advertising of data has been evaluated in terms of underlying qualities of said items; and output means for selectively outputting advertising data based on a correspondence between generated search data and said data associated with the advertising data.

* * * * *